United States Patent
Kagan et al.

(10) Patent No.: US 7,263,103 B2
(45) Date of Patent: Aug. 28, 2007

(54) RECEIVE QUEUE DESCRIPTOR POOL

(75) Inventors: Michael Kagan, Zichron Yaakov (IL);
Dafna Levenvirth, Beit Itzhak (IL);
Yossi Leybovitch, Kiriat Ata (IL)

(73) Assignee: Mellanox Technologies Ltd., Yokneam (IL)

( * ) Notice: Subject to any disclaimer, the term of this patent is extended or adjusted under 35 U.S.C. 154(b) by 1045 days.

(21) Appl. No.: 10/200,189

(22) Filed: Jul. 23, 2002

(65) Prior Publication Data

US 2004/0017819 A1   Jan. 29, 2004

(51) Int. Cl.
*H04L 12/28* (2006.01)
(52) U.S. Cl. .................................................. 370/412
(58) Field of Classification Search ............... 370/389, 370/392, 412, 413, 428, 429, 463; 709/214–216, 709/225, 250; 710/36, 39, 42, 52, 56
See application file for complete search history.

(56) References Cited

U.S. PATENT DOCUMENTS

| | | | | |
|---|---|---|---|---|
| 6,064,805 A | * | 5/2000 | McCrory et al. | ........... 709/227 |
| 6,553,438 B1 | * | 4/2003 | Coffman et al. | ............... 710/52 |
| 6,651,117 B1 | * | 11/2003 | Wilson et al. | ................. 710/33 |
| 7,036,118 B1 | * | 4/2006 | Ulery et al. | ................. 717/159 |
| 2002/0078271 A1 | * | 6/2002 | Berry | ........................... 710/36 |
| 2002/0141424 A1 | * | 10/2002 | Gasbarro et al. | ........... 370/412 |
| 2002/0159385 A1 | * | 10/2002 | Susnow et al. | ............. 370/229 |

OTHER PUBLICATIONS

InfiniBand™ Architecture Release 1.0 vol. 1—General Specifications, Oct. 24, 2000. (Available at: www.infinibandta.org).

* cited by examiner

*Primary Examiner*—Dmitry Levitan
(74) *Attorney, Agent, or Firm*—Mark M. Friedman

(57) ABSTRACT

A method for network communication includes providing a pool of descriptors to be shared among a plurality of transport service instances used in communicating over a network, each of the descriptors in the pool including a scatter list indicating a buffer that is available in a local memory. When a message containing data to be pushed to the local memory is received over the network on one of transport service instances, one of the descriptors is read from the pool. The data contained in the message are written to the buffer indicated by the scatter list included in the one of the descriptors.

2 Claims, 4 Drawing Sheets

RECEIVE QUEUE DESCRIPTOR POOL

FIELD OF THE INVENTION

The present invention relates generally to digital network communications, and specifically to network adapters for interfacing between a computing device and a packet data network.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the *InfiniBand Architecture Specification*, Release 1.0 (October, 2000), which is incorporated herein by reference. This document is available from the InfiniBand Trade Association at www.infinibandta.org.

Computing devices (hosts or peripherals) connect to the IB fabric via a network interface adapter, which is referred to in IB parlance as a channel adapter. The IB specification defines both a host channel adapter (HCA) for connecting a host processor to the fabric, and a target channel adapter (TCA), intended mainly for connecting peripheral devices to the fabric. Typically, the channel adapter is implemented as a single chip, with connections to the computing device and to the network. Client processes (referred to hereinafter as clients) running on a host processor communicate with the transport layer of the IB fabric by manipulating a transport service instance, known as a "queue pair" (QP) made up of a send work queue and a receive work queue. The IB specification permits the HCA to allocate as many as 16 million ($2^{24}$) QPs, each with a distinct queue pair number (QPN). A given client may open and use multiple QPs simultaneously.

To send and receive messages over the network using a HCA, the client initiates work requests (WRs), which cause work items, called work queue elements (WQEs), to be placed onto the appropriate work queues. Normally, each WR has a data buffer associated with it, to be used for holding the data that is sent or received in executing the WQE. Each QP has its own WQE chain and associated data buffers. Each WQE in the chain and the buffer associated with it are passed to the control of the HCA when the WQE is posted. The HCA then executes the WQEs, so as to communicate with the corresponding QP of the channel adapter at the other end of the link. After it has finished servicing a WQE, the HCA typically writes a completion queue element (CQE) to a completion queue, to be read by the client. The buffer associated with the WQE is freed for use by the client only after the CQE is generated.

The QP that initiates a particular operation, i.e. injects a message into the fabric, is referred to as the requester, while the QP that receives the message is referred to as the responder. an IB operation is defined to include a request message generated by the requester and, as appropriate, its corresponding response generated by the responder. (Not all request messages have responses.) Each message consists of one or more IB packets. Typically, a given HCA will serve simultaneously both as a requester, transmitting requests and receiving responses on behalf of local clients, and as a responder, receiving requests from other channel adapters and returning responses accordingly. Each QP is configured for a certain transport service type, which determines how the requesting and responding QPs interact. Both the source and destination QPs must be configured for the same service type. The IB specification defines four service types: reliable connection, unreliable connection, reliable datagram and unreliable datagram.

IB request messages include, inter alia, remote direct memory access (RDMA) write and send requests, RDMA read requests, and atomic read-modify-write requests. Both RDMA write and send requests carry data sent by the requester and cause the responder to write the data to a memory address at its own end of the link. Whereas RDMA write requests specify the address in the remote responder's memory to which the data are to be written, send requests rely on the responder to determine the memory location at the request destination. The send operation is sometimes referred to as a "push" operation, since the initiator of the data transfer pushes data to the remote QP. The receiving node's channel adapter places the data into the next available receive buffer for that QP. The send operation is also referred to as having channel semantics, because it moves data much like a mainframe I/O channel: each packet of data is tagged with a discriminator, and the destination processor chooses where to place the data based on the discriminator. In the case of IB send packets, the discriminator is the destination address (i.e., the local identifier, or LID) of the receiving channel adapter and the destination QP number.

To specify the receive buffers to use for incoming send requests received by a channel adapter, a client on the host computing device must generate receive WQEs and place them in the receive queues of the appropriate QPs. Each time a valid send request is received, the destination channel adapter takes the next WQE from the receive queue and places the received data in the memory location specified in that WQE. Thus, every valid incoming send request engenders a receive queue operation by the responder.

It follows from this paradigm of send message handling that the destination channel adapter can receive and process incoming send packets on a given QP only when there is an appropriate WQE waiting to be read from the receive queue of the QP. To meet this requirement, the host computing device must prepare and hold in memory at least one receive WQE for every QP that is configured to receive send messages. When an incoming send packet arrives at the destination channel adapter on a given QP, and there is no receive WQE available, the channel adapter cannot process the packet and must therefore discard it. In the case of reliable services, when there is no receive WQE on hand, the channel adapter returns a "Receiver Not Ready" (RNR) NACK packet to the requester. The requester may then retry the send request after a suitable waiting period has passed.

To avoid this situation, the IB specification provides a flow control mechanism for send messages using reliable connection services, based on end-to-end credits. As a rule, a requester cannot sent a request message unless it has the appropriate credits to do so. These credits are passed to the requester by the responder, wherein each credit represents the resources needed by the responder to receive one inbound request message. Specifically, each credit represents one WQE posted to the receive queue of the responding QP.

Given the large number of QPs (up to 16 million) that can be in use at any one time, the need to keep a WQE available in every receive queue can consume a great deal of memory. Practically speaking, it is much more efficient for both the host computing device and the channel adapter to create and maintain several WQEs in the receive queue at any given time, thus increasing even further the memory and computing resources needed for each QP. It can be seen that a prohibitive amount of memory is thus required if a large complement of QPs is to be supported, as provided by the IB specification.

SUMMARY OF THE INVENTION

It is an object of some aspects of the present invention to provide methods for receive queue management that enable efficient handling of incoming send messages without restricting the number of QPs that a channel adapter can support, and without consuming excessive amounts of memory. It is a further object of these aspects of the present invention to provide channel adapters that implement such methods.

It is a further object of some aspects of the present invention to provide improved methods for allocating buffers to receive data pushed over a network to a destination device using multiple transport service instances.

In preferred embodiments of the present invention, a network adapter is configured to receive incoming messages over a network, containing data to be pushed to local memory locations that are to be determined by the receiving network adapter. The messages are carried over the network using multiple different transport service instances. At least some of the multiple transport service instances share a common pool of receive descriptors, indicating the buffers in the local memory to which the data are to be pushed. When the adapter receives a message on any of these transport service instances that contains data to be pushed to the local memory, it reads the next descriptor from the pool and writes the data to the indicated location. The shared pool of descriptors thus obviates the need to maintain a separate queue of receive descriptors for each transport service instance.

In some preferred embodiments of the present invention, the network comprises an IB switch fabric. In these embodiments, the network adapter is a host channel adapter (HCA), the messages pushing data to the adapter are send messages, the transport service instances correspond to QPs serviced by the HCA, and the descriptors correspond to WQEs that would ordinarily be placed in the receive queues of the QPs. Sharing a pool of descriptors among multiple QPs, in place of maintaining an individual receive queue for each QP, is not an option that is provided by the IB specification. This novel technique, however, allows channel adapters to support a large number of QPs without allocating excessive amounts of memory to hold WQEs on all the receive queues. It also reduces the burden imposed on the host processor to monitor all the receive queues and keep them filled with descriptors. Instead, the host processor need deal with only a single pool of descriptors that can serve many QPs.

The methods of memory allocation provided by the present invention are conducive to balanced communication system design. In balanced designs, host applications running in conjunction with a channel adapter should, on average, consume data at the rate the data arrives from the network. This rate depends on the speed of the network, and not on the number of connections (QPs) served. Therefore, even when the host is serving many connections at once, the total amount of memory that must be allocated by the host to hold incoming data from the channel adapter should depend mainly (or exclusively) on the expected fluctuations in the rates of data arrival and processing. In this respect, the IB specification is wasteful of memory, as it requires memory allocation to scale up with the number of open connections. The present invention provides an alternative solution that maintains balance and efficiency in the use of memory resources.

There is therefore provided, in accordance with a preferred embodiment of the present invention, a method for network communication, including:

providing a pool of descriptors to be shared among a plurality of transport service instances used in communicating over a network, each of the descriptors in the pool including a scatter list indicating a buffer that is available in a local memory;

receiving a message over the network on one of transport service instances, the message including data to be pushed to the local memory; and responsive to receiving the message, reading one of the descriptors from the pool, and writing the data included in the message to the buffer indicated by the scatter list included in the one of the descriptors.

Preferably, providing the pool of descriptors includes writing the descriptors to the local memory using a host processor, and receiving the message includes receiving the message at a network adapter, which reads the one of the descriptors and writes the data to the buffer for processing by the host processor. In a preferred embodiment, the network includes a switch fabric, and the network adapter includes a channel adapter. Most preferably, writing the data includes, upon completion of writing the data to the buffer, submitting a completion report from the channel adapter to the host processor, the completion report including a pointer to the scatter list for use by the host processor in processing the data.

Preferably, providing the pool of descriptors includes providing multiple pools of descriptors, each belonging to a respective group of the transport service instances, and reading the one of the descriptors includes determining the group to which the one of the transport service instances belongs, and reading the one of the descriptors from the pool belonging to the group.

Further preferably, providing the pool of descriptors includes writing the descriptors to a circular list having a head and a tail, and reading the one of the descriptors includes selecting the one of the descriptors from the head of the list. Most preferably, selecting the one of the descriptors includes comparing the head and the tail of the list, and abstaining from writing the data to the buffer in the local memory if the head and tail coincide.

In a preferred embodiment, receiving the message includes receiving one or more packets having payloads including the data. Preferably, the network includes a switch fabric, and the transport service instances includes queue pairs, and the message includes a send message conveyed over the fabric by a remote requester. Most preferably, each of the descriptors corresponds to a work queue element in a receive queue of one of the queue pairs.

There is also provided, in accordance with a preferred embodiment of the present invention, a network adapter, including:

a network interface, adapted to receive a message over a network on one of a plurality of transport service instances, the message including data to be pushed to a local memory;

a host interface, adapted to be coupled to a host processor and to the local memory associated therewith; and message processing circuitry, coupled between the network interface and the host interface, which circuitry is adapted, responsive to receiving the message at the network interface, to read a descriptor from a pool of descriptors that is shared among the plurality of transport service instances, each of the descriptors in the pool including a scatter list indicating a buffer that is available in the local memory, and to write the data included in the message via the host interface to the buffer indicated by the scatter list included in the descriptor.

Preferably, the descriptors in the pool are prepared in the local memory by the host processor, and the message processing circuitry is adapted to read the descriptors from the pool via the host interface.

The present invention will be more fully understood from the following detailed description of the preferred embodiments thereof, taken together with the drawings in which:

DETAILED DESCRIPTION OF PREFERRED EMBODIMENTS

Figure 1:
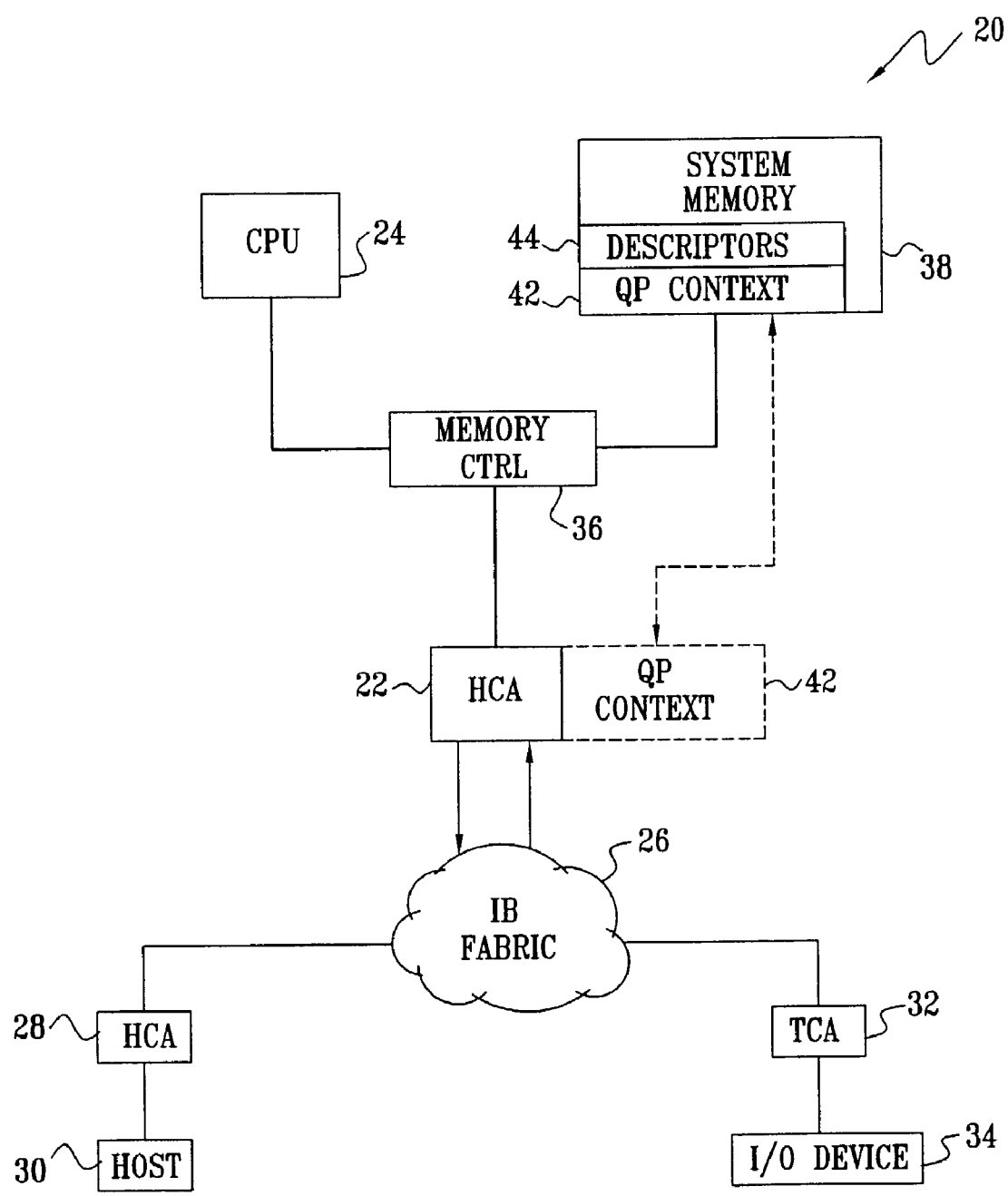
FIG. 1 is a block diagram that schematically illustrates a network communication system, in accordance with a preferred embodiment of the present invention.

FIG. 1 is a block diagram that schematically illustrates an IB network communication system 20, in accordance with a preferred embodiment of the present invention. In system 20, a HCA 22 couples a host processor 24 to an IB network (or fabric) 26. Typically, processor 24 comprises an Intel Pentium™ processor or other general-purpose computing device with suitable software. HCA 22 typically communicates via network 26 with other HCAs, such as a remote HCA 28 with a remote host 30, as well as with target channel adapters (TCAs), such as a TCA 32 connected to an input/output (I/O) device 34.

Host 24 and HCA 22 are connected to a local system memory 38 via a suitable memory controller 36, as is known in the art. The HCA and memory typically occupy certain ranges of physical addresses in a defined address space on a bus connected to the controller, such as a Peripheral Component Interface (PCI) bus. In addition to the host operating system, applications and other data (not shown), memory 38 holds data structures that are accessed and used by HCA 22. These data structures preferably include QP context information 42 maintained by the HCA, and descriptors 44 corresponding to WQEs to be carried out by HCA 22. Although memory 38 is shown in FIG. 1 as a single unit, which holds both control information and message payload data, the functions of the memory may be broken up among several units for purposes of convenient organization and access by host 24 and HCA 22. The term system memory, as used in the present patent application and in the claims, should be understood broadly to encompass all areas of local memory that can be accessed by host 24.

Descriptors 44 are written to memory 38 by client processes running on host 24. They include send descriptors, corresponding to outgoing request messages to be sent over fabric 26 by HCA 22, and receive descriptors, used by the HCA to handle incoming send messages from remote requesters, such as HCA 28. The send descriptors are placed in the appropriate send queues of QPs for service by HCA 22, and are not of direct relevance to the present invention. At least a portion of the receive descriptors, however, are not placed directly in the receive queues of individual QPs. Rather, they are held in a descriptor pool, as described below, which is shared among multiple QPs. Each of the receive descriptors contains a scatter list, comprising one or more scatter entries, each indicating a range of addresses in memory 38 to which HCA 22 should write the data contained in the send message. Preferably, each scatter entry includes a base address and a length of the data to be written beginning at the base address.

Figure 2:
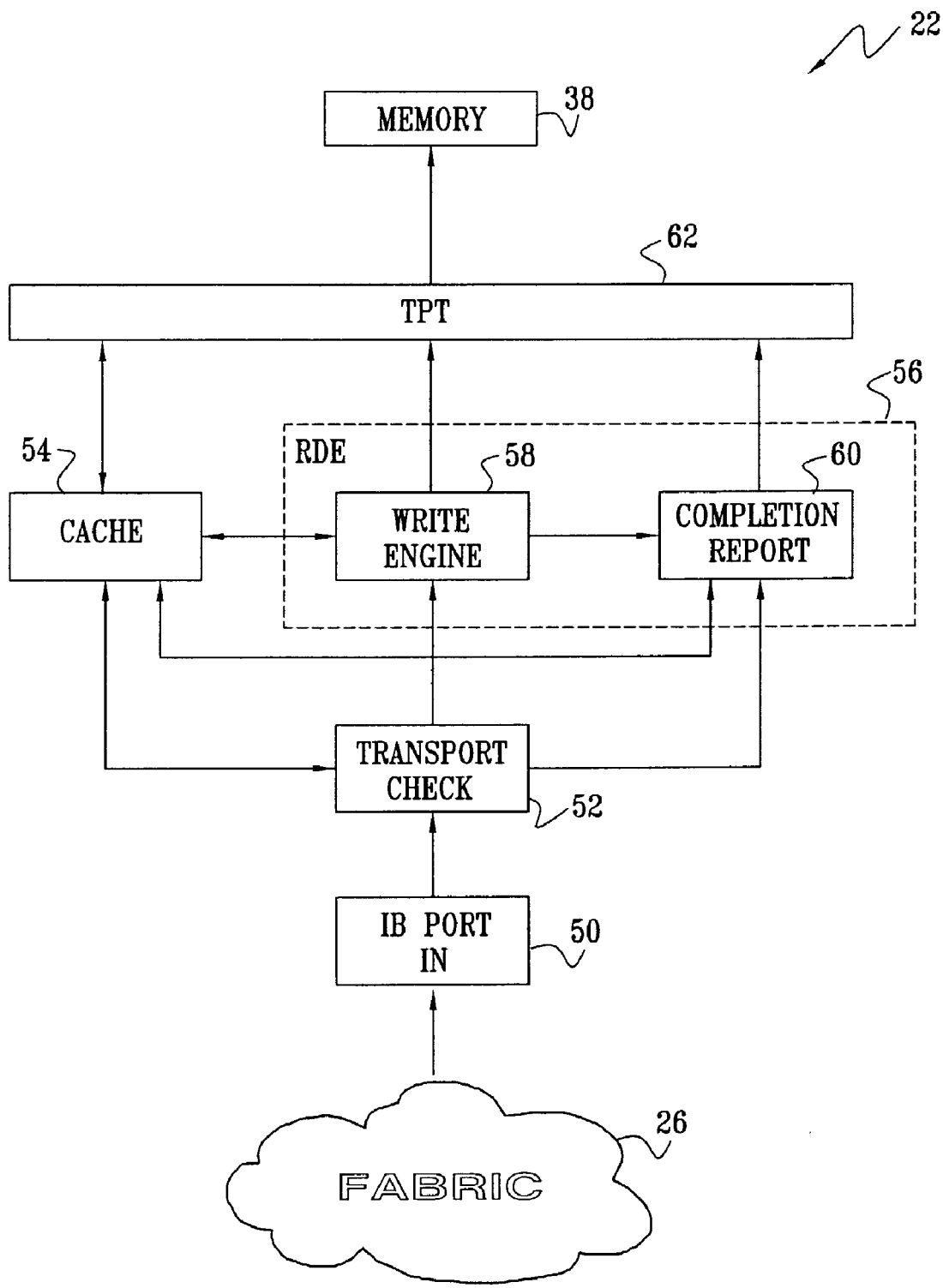
FIG. 2 is a block diagram that schematically shows details of a host network adapter, in accordance with a preferred embodiment of the present invention.

FIG. 2 is a block diagram that schematically shows details of HCA 22, in accordance with a preferred embodiment of the present invention. For the sake of simplicity, elements of HCA 22 that are not essential to an understanding of the present invention are omitted. The blocks and links that must be added to create a fully-operational HCA will be apparent to those skilled in the art. Further details of such a HCA are described in U.S. patent application Ser. No. 10/000,456, filed Dec. 4, 2001, which is assigned to the assignee of the present patent application, and whose disclosure is incorporated herein by reference.

The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single embedded processor. Preferably, all of the elements of the HCA are implemented in a single integrated circuit chip, but multi-chip implementations are also within the scope of the present invention.

Incoming packets from fabric 26 are received by HCA 22 at an input port 50, which serves as a network interface. A transport check unit (TCU) 52 processes and verifies transport-layer information contained in the incoming packets, in order to confirm the validity of the packets and to determine how they are to be handled. For this purpose, the TCU reads the destination QP of each incoming packet, and then looks up the relevant context information 42 for the QP. Preferably, a cache 54 holds a copy of at least a portion of the context information that is required by the elements of HCA 22 for processing incoming and outgoing packets on active QPs. If the TCU does not find the required context information in cache 54, the information is loaded into the cache from memory 38. Further details of the operation of cache 54 are described in a U.S. patent application Ser. No. 10/052,413 entitled, "Queue Pair Context Cache," filed Jan. 23, 2002, which is assigned to the assignee of the present patent application and whose disclosure is incorporated herein by reference.

When the incoming packet contains data to be written to memory 38, such as a RDMA write or send request packet, TCU 52 passes the packets to a receive data engine (RDE) 56, which attends to executing the requests. A write engine 58 in RDE 56 writes the packet data, via a translation protection table (TPT) 58, to addresses in memory 38 that are specified in the applicable scatter list. TPT 58 acts as a host interface in HCA 22, performing address translation and protection checks to control access to memory 38 both by elements of HCA 22 and by other, remote entities connected to network 26. Each RDMA write message carries its own scatter list, which is prepared by the remote requester. To process incoming send messages, however, write engine 58 must read a receive descriptor from memory 38, and use the scatter list provided by the descriptor. Processing of incoming send messages by RDE 56 is described in greater detail hereinbelow. After processing of an incoming send message has been completed (and likewise, processing of other types of messages, when required), a completion reporter 60 writes a CQE to a completion queue in memory 38. Write engine 58 and completion reporter 60 also use QP and completion queue context information that is held in cache 54.

Preferably, when a given QP on HCA 22 is configured to receive send messages, the QP can be set up by host 24 either to have its own queue of receive descriptors, as prescribed by the IB specification, or to share descriptors in a pool with other QPs. Most preferably, multiple pools of this sort are supported by HCA 22. The configuration of the QP as a pool member is preferably indicated by a flag in QP context 42, as well as by a field in the context identifying the pool to which the QP belongs.

Figure 3:
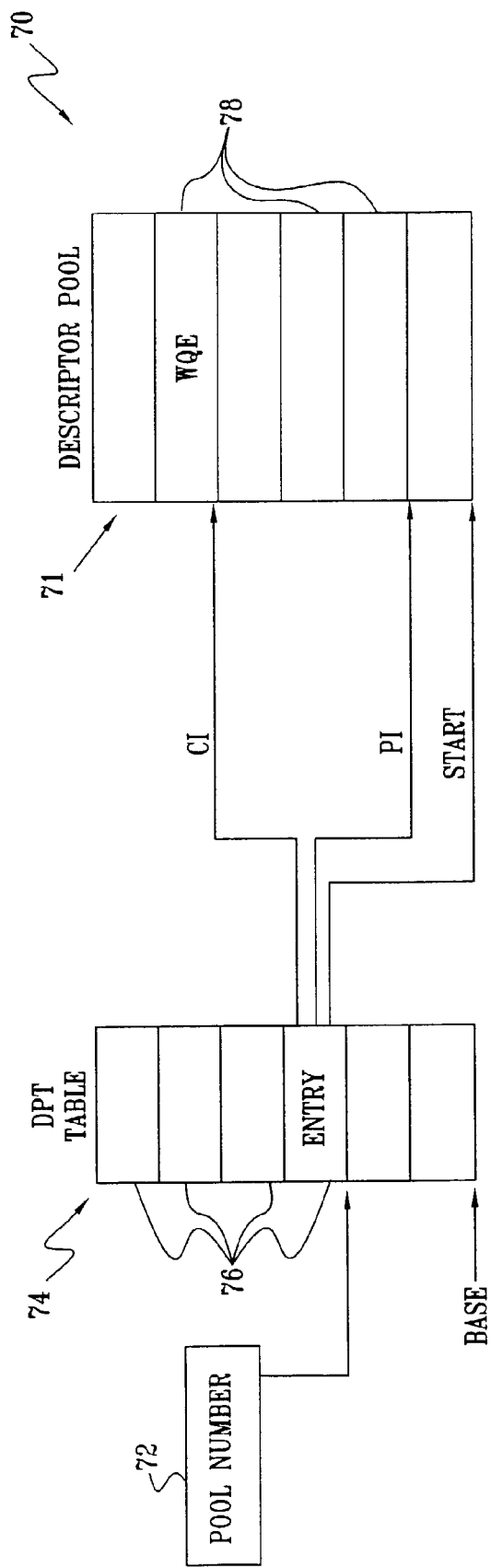
FIG. 3 is a block diagram that schematically illustrates data structures used by a network adapter in processing incoming messages, in accordance with a preferred embodiment of the present invention.

FIG. 3 is a block diagram that schematically illustrates data structures 70 maintained in memory 38, which are used by RDE 56 in processing incoming send messages, in accordance with a preferred embodiment of the present invention. These structures are built around a descriptor pool 71, which serves a group of QPs. Other QPs may have their own, individual receive queues (not shown in the figures), as provided by the IB specification. Optionally, for more efficient operation of RDE 56, some or all of the data in structures 70 are copied to cache 54, as well.

Host 24 writes descriptors 78, or WQEs, to each open descriptor pool 71. Preferably, for efficient operation, the host writes sequences of multiple descriptors without waiting for the pool to empty. The descriptors are preferably arranged in a cyclic buffer. When the host writes a descriptor to the buffer, it moves a producer index (PI) so that it points to the tail of the pool, i.e., to the last descriptor it has created. A consumer index (CI) points to the head of the queue and is manipulated by RDE 56 to indicate the next descriptor to be read from the pool. For each pool 71, the producer and consumer indices are recorded and maintained relative to a predetermined base address. The use of these pointers is described in greater detail hereinbelow.

Upon receiving a send message on a given QP, and determining that the QP belongs to a receive descriptor pool, RDE 56 reads a pool number 72 for the QP from QP context information 42 (which is preferably held in cache 54). The pool number serves as an index (relative to a predetermined base address) to an entry 76 in a descriptor pool table (DPT) 74. Entry 76 contains information for use by the RDE in finding descriptors 78 to read from the descriptor pool 71 that is assigned to this QP. The same entry 76 is used for all the QPs belonging to the same pool.

Each entry 76 in DPT 74 preferably includes the following information:
Start address—base address of pool 71 in memory 38.
Size of the descriptors in this pool. The size determines the length of the scatter lists that can be used.
Total size of the pool, i.e., the maximum number of descriptors that the pool can hold. When the producer or consumer index reaches this value, it wraps back to the base address.
Owner of the pool (client software or HCA hardware—when the owner is "hardware," it means that the descriptors in the pool are available for use by the HCA).
Producer index address—memory location to which host 24 writes and updates the value of the producer index of pool 71.
Consumer index.

Each descriptor 78 comprises one or more scatter entries, each indicating a buffer in memory 38 to which write engine 58 should write the data contained in an incoming send message. Preferably, each scatter entry includes a base address and a length of the data that can be written beginning at the base address. In addition, descriptor 78 may include other fields used for control and signaling to HCA 22. The structure of descriptors 78 in pool 71 is preferably the same as that of the descriptors that are placed in the receive queues of QPs that are not pool members.

Figure 4:
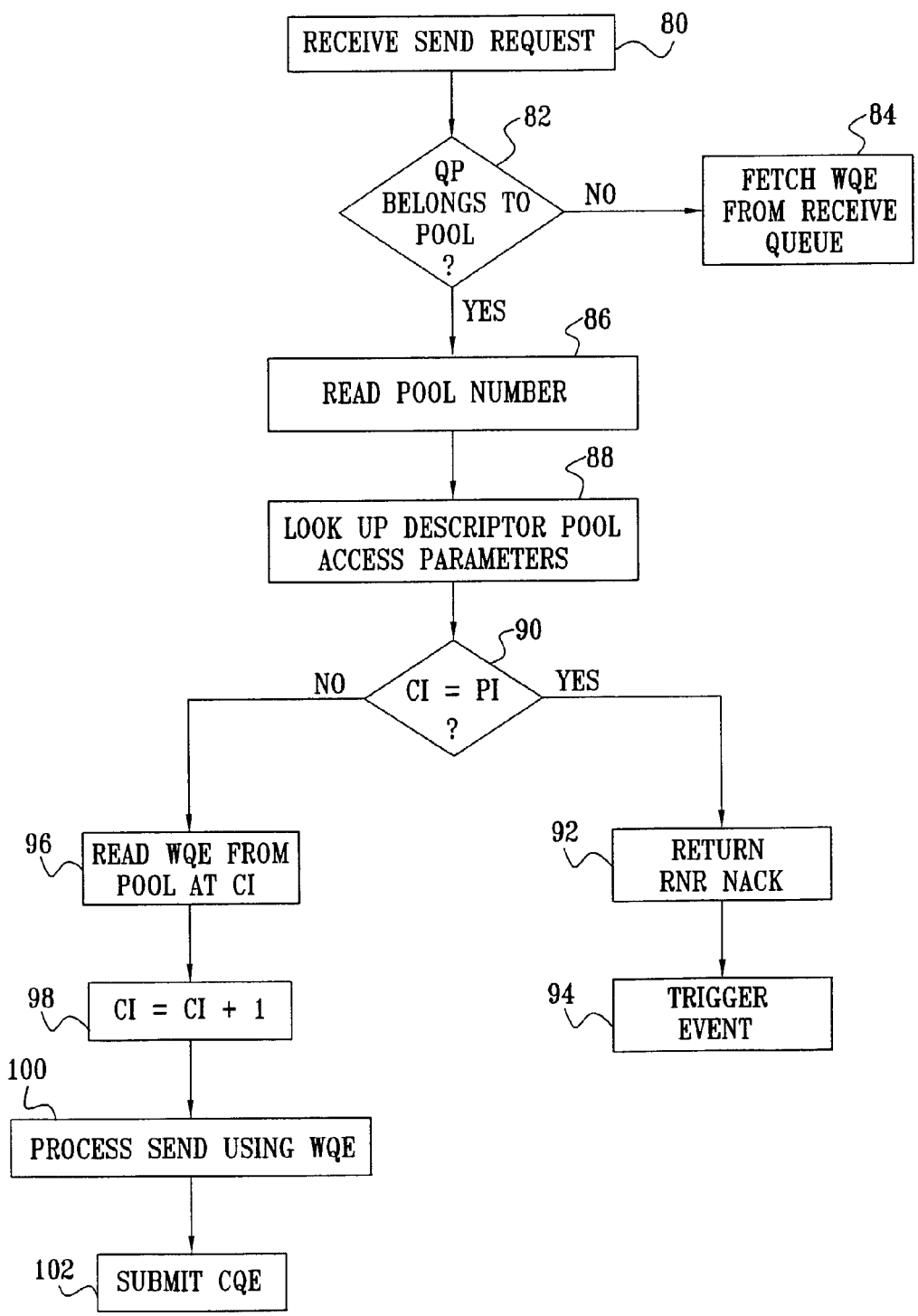
FIG. 4 is a flow chart that schematically illustrates a method for processing an incoming message, in accordance with a preferred embodiment of the present invention.

FIG. 4 is a flow chart that schematically illustrates a method by which HCA 22 processes incoming send request messages, in accordance with a preferred embodiment of the present invention. The method is initiated when TCU 52 receives a send packet from a remote requester via fabric 26, at a send reception step 80. After completing the required transport checks, the TCU passes the packet to RDE 56 for service. Note that IB send messages may comprise multiple packets, depending on the volume of data carried by the message and the maximum transfer unit (MTU) of the links over which the message travels. In the description that follows, it is assumed that the packet received at step 80 is the first or only packet in the send message. For multi-packet messages, the same descriptor that is fetched and used to scatter the data in the first packet is retained by RDE 56 for use in processing the subsequent packets in the message, as well.

Write engine 58 determines the destination QP of the send packet, based on the packet header, and then looks up the context of the QP in cache 54, at a pool membership checking step 82. As noted above, the context indicates whether or not this QP belongs to a descriptor pool. If the QP is not a pool member, then in order to receive a send message, there must be a WQE available in the specific receive queue of this QP. The write engine reads the WQE address from the QP context and then fetches the WQE from the receive queue, at a descriptor fetching step 84. It then processes the send message in the usual way, as provided by the IB specification.

If write engine 58 determines at step 82 that the destination QP does, in fact, belong to a receive descriptor pool, it reads the number of the pool from the QP context, at a pool number reading step 86. It uses this number to find the information necessary to access descriptor pool 71 to which this QP belongs, at an information lookup step 88. This information is typically contained in entry 76 in table 74 (FIG. 3), which is indexed by pool number 72. Additionally, in order to access descriptor pool 71 in memory 38, the write engine may need an access key, as is known in the art. This key is typically held in the QP context, and is preferably the same for all QPs belonging to the pool.

Using the information in entry 76, write engine 58 reads the consumer index (CI) and producer index (PI) of descriptor pool 71, at an index checking step 90. If the values of these indices are equal, it means that all descriptors 78 in pool 71 have already been used. Without a valid descriptor, the write engine is unable to process the current send packet. Under these circumstances, the send packet is typically discarded. If the send packet was sent on a reliable service, write engine 58 instructs a send data engine (not shown) in HCA 22 to return a RNR NACK packet to the sender, at a NACK return step 92. The sender may subsequently resend the packet. Meanwhile, in such a case, the write engine preferably triggers an event, at an event submission step 94, which is placed in an event queue to be read by host 24. Optionally, an interrupt may be generated, as well, to prompt the host to service the event queue. When the host reads the event, it will be alerted to the fact that descriptors 78 in pool 71 have been exhausted. The host software should then generate new descriptors to replenish the pool.

As long as the values of CI and PI are not equal, write engine 58 reads descriptor 78 from the head of the circular buffer in pool 71, at the location indicated by the CI, at a descriptor reading step 96. It increments the CI to point to the next descriptor in the pool, at an index incrementation step 98. The write engine then uses the scatter list provided by the descriptor it has read in processing the send packet data, at a packet processing step 100. To perform this processing, the write engine reads the first scatter entry from the scatter list in descriptor 78, which points to the first buffer to receive the data in memory 38. The write engine pushes the data from the packet to this first buffer, until the buffer is filled. It then reads the next scatter entry, and continues pushing the data to the location that this scatter entry indicates. For multi-packet send messages, as long as HCA 22 continues to receive additional packets in the same message, the write engine proceeds through the scatter list entries of the descriptor it has read from the pool, until the message is completed.

Upon completion of an incoming send message, write engine 58 instructs completion reporter 60 to generate a completion queue element (CQE), at a CQE generation step 102. The completion reporter places the CQE in a completion queue in memory 38, to be read by client software on host 24. optionally, an event or interrupt may also be generated to notify the host that there are new data in memory 38 waiting to be read. Preferably, the CQE indicates the QP on which the incoming send message was received and includes a pointer to the descriptor 78 in pool 71 that was used in processing the message that has now been completed. Host 24 reads the scatter list from the descriptor in order to determine the location of the data to be read in memory 38. Once the host has read the data, the descriptor is no longer needed and can be overwritten by a new descriptor.

As noted above, for send messages using reliable connection services, the IB specification provides a flow control mechanism based on end-to-end credits. Typically, each credit represents one WQE posted to the receive queue of the responding QP. A QP that draws its WQEs from a shared descriptor pool, however, has no WQEs posted to its receive queue. Instead, these QPs may send credits to the corresponding requester based on the number of descriptors 78 posted to pool 71 (preferably a smaller number of credits on each QP than there are actual descriptors in the pool). As long as an appropriate statistical relationship is maintained between the number of credits and the number of descriptors in the pool, there will usually be a descriptor available to handle each send message that arrives. Alternatively, even if the QPs belonging to pool 71 do not send credits to their corresponding requesters, or if a requester exhausts its credits, the requester may still transmit send packets in limited mode, as described in section 9.7.7.2.5 of the IB specification.

Although preferred embodiments are described herein with specific reference to IB terminology and conventions, the principles of the present invention may similarly be applied to handling of data "push" operations and message transfers using channel semantics in networks of other types. For example, the methods described hereinabove can be used in protocol bridge applications, in which multiple connections on a first network are served by a single sink to a second network. In this manner multiple hosts on the first network (for instance, on an IB fabric) can be connected to a converter that channels their traffic to the second network (such as an Ethernet network). by means of this mechanism, the amount of memory required by the protocol bridge is substantially reduced.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for network communication, comprising:
providing a pool of descriptors to be shared among a plurality of transport service instances used in communicating over a network, each of the descriptors in the pool comprising a scatter list indicating a buffer that is available in a local memory;
receiving a message over the network on one of transport service instances, the message comprising data to be pushed to the local memory; and
responsive to receiving the message, reading one of the descriptors from the pool, and writing the data comprised in the message to the buffer indicated by the scatter list comprised in the one of the descriptors;
wherein providing the pool of descriptors comprises writing the descriptors to a circular list having a head and a tail, and wherein reading the one of the descriptors comprises selecting the one of the descriptors from the head of the list; and
wherein selecting the one of the descriptors comprises comparing the head and the tail of the list, and abstaining from writing the data to the buffer in the local memory if the head and tail coincide.

2. A network adapter, comprising:
a network interface, adapted to receive a message over a network on one of a plurality of transport service instances, the message comprising data to be pushed to a local memory;
a host interface, adapted to be coupled to a host processor and to the local memory associated therewith; and
message processing circuitry, coupled between the network interface and the host interface, which circuitry is adapted, responsive to receiving the message at the network interface, to read a descriptor from a pool of descriptors that is shared among the plurality of transport service instances, each of the descriptors in the pool comprising a scatter list indicating a buffer that is available in the local memory, and to write the data comprised in the message via the host interface to the buffer indicated by the scatter list comprised in the descriptor;
wherein the descriptors are entered in the pool in a circular list having a head and a tail, and wherein the message processing circuitry is adapted to read the descriptor from the head of the list; and
wherein the message processing circuitry is adapted to compare the head and the tail of the list, and to abstain from writing the data to the buffer in the local memory if the head and tail coincide.

* * * * *